(12) United States Patent
Gonda et al.

(10) Patent No.: US 11,404,748 B2
(45) Date of Patent: Aug. 2, 2022

(54) ELECTRODE/SEPARATOR LAYERED BODY AND NICKEL ZINC BATTERY EQUIPPED THEREWITH

(71) Applicant: NGK INSULATORS, LTD., Nagoya (JP)

(72) Inventors: Yuichi Gonda, Nagoya (JP); Kenshin Kitoh, Nagoya (JP); Takeshi Yagi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 44 days.

(21) Appl. No.: 16/406,674

(22) Filed: May 8, 2019

(65) Prior Publication Data
US 2019/0267597 A1    Aug. 29, 2019

Related U.S. Application Data

(63) Continuation of application No. PCT/JP2017/030550, filed on Aug. 25, 2017.

(30) Foreign Application Priority Data

Dec. 7, 2016   (JP) .............................. JP2016-237871

(51) Int. Cl.
*H01M 4/38* (2006.01)
*H01M 4/48* (2010.01)
(Continued)

(52) U.S. Cl.
CPC ............ *H01M 50/46* (2021.01); *H01M 4/38* (2013.01); *H01M 4/483* (2013.01); *H01M 4/523* (2013.01);
(Continued)

(58) Field of Classification Search
CPC ..................................................... H01M 2/673
See application file for complete search history.

(56) References Cited

U.S. PATENT DOCUMENTS

| | | | |
|---|---|---|---|
| 4,911,993 | A | 3/1990 | Turley et al. |
| 2002/0064710 | A1 | 5/2002 | Kawakami et al. |

(Continued)

FOREIGN PATENT DOCUMENTS

| | | | |
|---|---|---|---|
| JP | 01186573 A | | 7/1989 |
| JP | 01225072 A | | 9/1989 |

(Continued)

OTHER PUBLICATIONS

International Search Report for corresponding PCT/JP2017/030550, including English translation, dated Nov. 7, 2017 (5 pages).

(Continued)

*Primary Examiner* — Maria Laios
*Assistant Examiner* — Angela J Martin
(74) *Attorney, Agent, or Firm* — Flynn Thiel, P.C.

(57) ABSTRACT

An electrode-separator assembly is provided that can drastically facilitate assembly of a LDH separator-equipped nickel-zinc battery without the work, structure, or components for the complete separation of a positive-electrode chamber from a negative-electrode chamber. The electrode-separator assembly includes a positive-electrode plate, a negative-electrode plate, a layered double hydroxide (LDH) separator for separation of the positive-electrode plate from the negative-electrode plate, and a resin frame having an opening to which the LDH separator and the positive-electrode plate are fitted or joined. The positive-electrode plate has a smaller face than the negative-electrode plate. The negative-electrode plate has a clearance area that does not overlap with the positive-electrode plate over a predetermined width from the outer peripheral edge of the nega- (Continued)

tive-electrode plate. The peripheral end faces of the LDH separator, and a segment of the separator adjacent to the positive-electrode plate and corresponding to the clearance area, are covered with the resin frame.

12 Claims, 15 Drawing Sheets

(51) Int. Cl.
    *H01M 4/52*     (2010.01)
    *H01M 10/30*     (2006.01)
    *H01M 50/46*     (2021.01)
    *H01M 50/10*     (2021.01)
    *H01M 50/40*     (2021.01)
    *H01M 50/409*     (2021.01)
    *H01M 50/431*     (2021.01)
    *H01M 50/463*     (2021.01)
    *H01M 50/531*     (2021.01)

(52) U.S. Cl.
    CPC ........... *H01M 10/30* (2013.01); *H01M 50/10* (2021.01); *H01M 50/409* (2021.01); *H01M 50/431* (2021.01); *H01M 50/463* (2021.01); *H01M 50/531* (2021.01)

(56) References Cited

U.S. PATENT DOCUMENTS

| | | | |
|---|---|---|---|
| 2011/0059343 A1* | 3/2011 | McKinney | H01M 10/0431 429/94 |
| 2013/0309540 A1 | 11/2013 | Nakaishi et al. | |
| 2014/0030567 A1* | 1/2014 | McKinney | H01M 2/1673 429/94 |
| 2014/0315099 A1 | 10/2014 | Yamada et al. | |
| 2017/0077476 A1 | 3/2017 | Kitoh et al. | |
| 2018/0083246 A1 | 3/2018 | Gonda et al. | |
| 2018/0248165 A1* | 8/2018 | Gonda | H01M 2/1686 |

FOREIGN PATENT DOCUMENTS

| | | |
|---|---|---|
| WO | 2012133747 A1 | 10/2012 |
| WO | 2013118561 A1 | 8/2013 |
| WO | 2016076047 A1 | 5/2016 |
| WO | 2016204050 A1 | 12/2016 |

OTHER PUBLICATIONS

Written Opinion of the International Searching Authority for corresponding PCT/JP2017/030550, including English translation, dated Nov. 7, 2017 (9 pages).
Chinese Office Action with English Translation issued in corresponding Chinese Application No. 201780071401.8 dated Aug. 25, 2021 (14 pages).

* cited by examiner

ELECTRODE/SEPARATOR LAYERED BODY AND NICKEL ZINC BATTERY EQUIPPED THEREWITH

CROSS-REFERENCE TO RELATED APPLICATIONS

This is a continuation of PCT/JP2017/030550 filed Aug. 25, 2017, which claims priority to Japanese Patent Application No. 2016-237871 filed Dec. 7, 2016, the entire contents of which are hereby incorporated by reference.

BACKGROUND OF THE INVENTION

1. Field of the Invention

The present invention relates to an electrode-separator assembly and a nickel-zinc battery including such an assembly.

2. Description of the Related Art

In secondary zinc batteries, for example, secondary nickel-zinc batteries and secondary air-zinc batteries, it is known that metallic zinc dendrites precipitate on negative electrodes during a charge mode, penetrate through voids in separators composed of, for example, non-woven fabrics, and reach positive electrodes, resulting in a short circuit. The short circuit caused by such zinc dendrites leads to a reduction in the charge and discharge repetition lifetime of the secondary zinc batteries.

In order to solve such a problem, secondary zinc batteries have been proposed that include layered double hydroxide (LDH) separators selectively permitting the migration of hydroxide ions while blocking zinc dendrites. For example, Patent Document 1 (WO2013/118561) discloses a secondary nickel-zinc battery including a LDH separator disposed between a positive electrode and a negative electrode. Patent Document 2 (WO2016/076047) discloses a separator structure including a LDH separator that is fitted in or joined to a resin frame and has a denseness high enough to inhibit permeation of gas and/or water. Patent Document 2 also discloses that the LDH separator may be a composite with a porous substrate.

CITATION LIST

Patent Literature

Patent Document 1: WO2013/118561
Patent Document 2: WO2016/076047

SUMMARY OF THE INVENTION

The nickel-zinc battery including the LDH separator described above can effectively prevent the short circuit caused by the zinc dendrites between the positive electrode and the negative electrode. To maximize this advantage, Patent Literature 2 recommends to completely separate a positive-electrode chamber (a compartment containing a positive electrode and an electrolyte) from a negative-electrode chamber (a compartment containing a negative electrode and an electrolyte) with the LDH separator provided with the resin frame in a battery container such that the positive-electrode chamber is not in fluid communication with the negative-electrode chamber. Unfortunately, the resin frame, which is typically square or rectangular and accommodates the LDH separator, should be liquid-tightly joined to at least three sides of the inner wall of a battery container or a battery package to completely separate the positive-electrode chamber from the negative-electrode chamber. Thus, the resin frame should have many contact points and requires troublesome joining work. As a result, the assembling work takes a prolonged time. This drawback is more noticeable in the case of making a battery pack including multiple unit cells. The troublesome joining work must be repeated every unit cell. Furthermore, a nozzle is inserted into all of the positive and negative-electrode chambers for an injection of the electrolyte.

The inventors have found that by making a positive-electrode plate smaller than a negative-electrode plate and daring to block the outer periphery of a LDH separator with a resin frame, it is possible to effectively inhibit the short circuit caused by zinc dendrites between the positive electrode and the negative electrode in a nickel-zinc battery without the complete separation of the positive-electrode chamber from the negative-electrode chamber. The inventors have thereby discovered an electrode-separator structure that can drastically facilitate assembly of a LDH separator-equipped nickel-zinc battery (in particular, a nickel-zinc battery pack) without the work, structure, or components for the complete separation of the positive-electrode chamber from the negative-electrode chamber.

An object of the present invention is to provide an electrode-separator assembly that can drastically facilitate assembly of a LDH separator-equipped nickel-zinc battery (in particular, a nickel-zinc battery pack) without the work, structure, or components for the complete separation of a positive-electrode chamber from a negative-electrode chamber. Another object of the invention is to provide a nickel-zinc battery including such an electrode-separator assembly (in particular, a nickel-zinc battery pack).

One aspect of the present invention provides an electrode-separator assembly for a nickel-zinc battery, including:
- a positive-electrode plate containing nickel hydroxide and/or nickel oxyhydroxide;
- a negative-electrode plate containing zinc and/or zinc oxide;
- a layered double hydroxide (LDH) separator for separation of the positive-electrode plate from the negative-electrode plate, the LDH separator being capable of conducting hydroxide ions therethrough; and
- a resin frame having an opening, the LDH separator and the positive-electrode plate being fitted or joined to the opening, where
the positive-electrode plate has a narrower face than the negative-electrode plate such that the negative-electrode plate has a clearance area that does not overlap with the positive-electrode plate over a predetermined width from the outer peripheral edge of the negative-electrode plate, and
the peripheral end faces of the LDH separator and a segment of the LDH separator are covered with the resin frame, the segment being adjacent to the positive-electrode plate and corresponding to the clearance area.

Another aspect of the present invention provides a nickel-zinc battery including:
- a resin container;
- the electrode-separator assembly accommodated in the resin container; and
- an electrolyte containing an aqueous alkali metal hydroxide solution.

Another aspect of the present invention provides a nickel-zinc battery pack including:

a resin container;
a plurality of the electrode-separator assemblies disposed in parallel and accommodated in the resin container without being separated from each other by partition walls; and
an electrolyte containing an aqueous alkali metal hydroxide solution.

DETAILED DESCRIPTION OF THE INVENTION

Electrode-Separator Laminate

Figure 1:
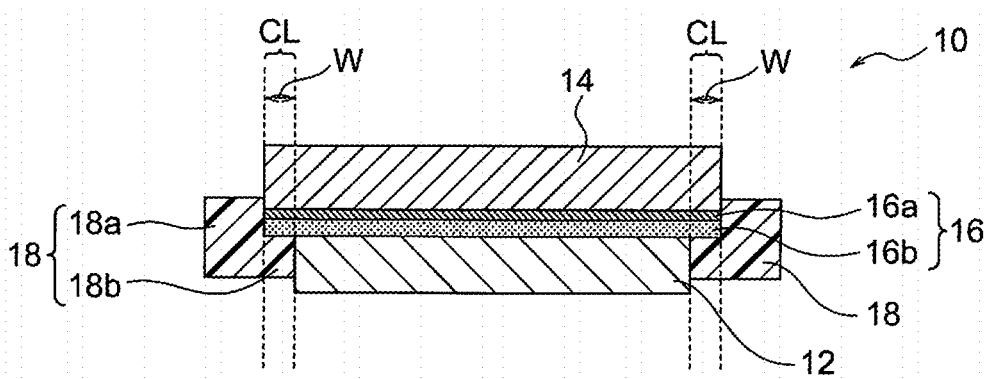
FIG. 1 is a schematic cross-sectional view of an electrode-separator assembly according to an embodiment of the present invention.

An electrode-separator assembly according to the present invention is used in a nickel-zinc battery and, in particular, in a secondary nickel-zinc battery. FIG. 1 schematically illustrates a configuration of an electrode-separator assembly 10. The electrode-separator assembly 10 includes a positive-electrode plate 12, a negative-electrode plate 14, a layered double hydroxide (LDH) separator 16, and a resin frame 18. The positive-electrode plate 12 contains nickel hydroxide and/or nickel oxyhydroxide. The negative-electrode plate 14 contains zinc and/or zinc oxide. The LDH separator 16 contains a layered double hydroxide (LDH) and separates the positive-electrode plate 12 from the negative-electrode plate 14. The LDH separator 16 is capable of conducting hydroxide ions. A typical LDH separator 16 includes a LDH membrane 16a and an optional porous substrate 16b. The resin frame 18 has an opening in which the LDH separator 16 and the positive-electrode plate 12 are fitted or joined. The positive-electrode plate 12 has a narrower face than the negative-electrode plate 14. Thus, the negative-electrode plate 14 has a clearance area CL that does not overlap the positive-electrode plate 12 over a predetermined width W from the outer peripheral edge of the negative-electrode plate 14. The peripheral end faces of the LDH separator 16, and a segment of the LDH separator 16 adjacent to the positive-electrode plate 12 and corresponding to the clearance area CL, are covered with the resin frame 18. In this manner, making the positive-electrode plate 12 smaller than the negative-electrode plate 14 and daring to block the outer periphery of the LDH separator 16 with the resin frame 18 make it possible to prevent short circuit caused by zinc dendrites between the positive electrode and the negative electrode in the nickel-zinc battery without the complete separation of a positive-electrode chamber from a negative-electrode chamber. The mechanism will be explained below.

Figure 2:
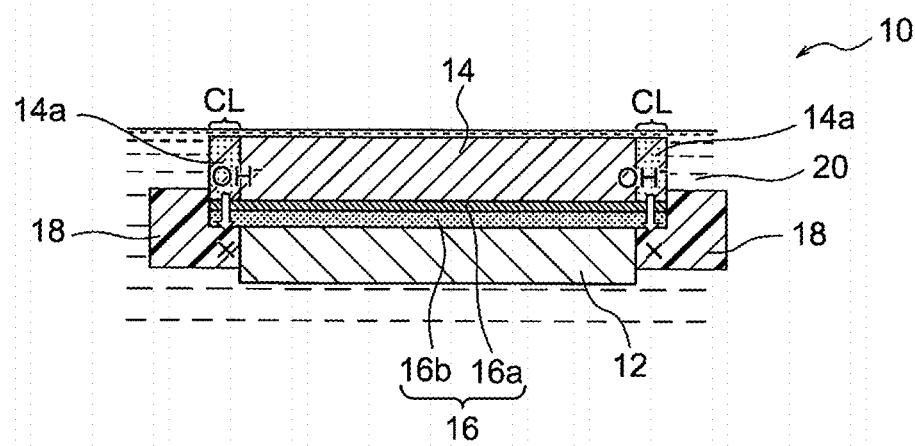
FIG. 2 illustrates the state of electrode reaction in a nickel-zinc battery including the electrode-separator assembly in FIG. 1.

FIG. 2 schematically illustrates the state of electrode reactions in the nickel-zinc battery including the electrode-separator assembly 10. As illustrated in FIG. 2, the electrode-separator assembly 10 in this state is immersed in an electrolyte 20. During a charge mode, hydroxide ions (OH⁻) migrate from the negative-electrode plate 14 to the positive-electrode plate 12 through the LDH separator 16 according to the following reactions:

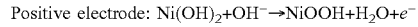

Positive electrode: $Ni(OH)_2 + OH^- \rightarrow NiOOH + H_2O + e^-$

Negative electrode: $ZnO + H_2O + 2e^- \rightarrow Zn + 2OH^-$

During the charge mode, the undesired zinc dendrites are precipitated on the negative-electrode plate 14. In contrast, the configuration accordance with the present invention can prevent the precipitation of zinc dendrites in the clearance area CL of the negative-electrode plate 14. The reason is that the resin frame 18 instead of the positive-electrode plate 12 is disposed in the area facing the negative-electrode plate 14 and corresponding to the clearance area CL of the negative-electrode plate 14. The resin frame 18 restricts delivery of OH⁻ ions between the electrolyte 20 and the LDH separator 16. OH⁻ ions cannot be substantially delivered between the positive-electrode plate 12 and the negative-electrode plate 14 in the clearance area CL. Thus, the clearance area CL is a dead zone 14a that does not substantially contribute to the reaction in the negative electrode. Thus, although the zinc dendrites inevitably precipitate and grow from the negative-electrode plate 14 during the repeated charge and discharge modes, the configuration of the present invention can prevent the zinc dendrites from precipitating around the outer periphery of the negative-electrode plate 14 to extend beyond the outer periphery. The zinc dendrites do not precipitate around the outer periphery of the negative-electrode plate 14 and thus do not extend in pathways circumventing the resin frame 18 and leading to the positive-electrode plate 12, resulting in prevention of the short circuit caused by the zinc dendrites between the positive electrode and the negative electrode. If the composite structure of the LDH separator 16 and the resin frame 18 could completely prevent the zinc dendrite from penetrating through the LDH separator, the remaining possible short circuit between the positive electrode and the negative electrode would lie in the zinc dendrites extending in the pathways circumventing the resin frame 18. The present invention can also effectively prevent the zinc dendrites from extending in the circumventing pathways. This surprisingly remarkable advantage indicates that a common electrolyte can be used without separation of the positive-electrode chamber from the negative-electrode chamber. The short circuit caused by the zinc dendrites between the positive electrode and the negative electrode in the nickel-zinc battery can be effectively prevented even if the positive-electrode chamber is not completely separated from the negative-electrode chamber. For example, an exterior member 22, such as a resin film illustrated in FIG. 10, need not be hermetically joined to the resin frame 18 by thermal bonding to completely isolate the positive-electrode chamber from the negative-electrode chamber to block fluid communication therebetween. This is particularly advantageous to the assembly of a nickel-zinc battery pack illustrated in FIGS. 6A to 6D. In traditional battery packs, the troublesome joining work described above is essential for all of the unit cells. In addition, a nozzle should be inserted into each of the positive and negative-electrode chambers to inject an electrolyte. In contrast, the configuration of the present invention does not require such troublesome work. Thus, the electrode-separator assembly 10 can drastically facilitate assembly of a LDH separator-equipped nickel-zinc battery (in particular, a nickel-zinc battery pack) without the work, structure, or components for the complete separation of the positive-electrode chamber from the negative-electrode chamber.

Positive-Electrode Plate

The positive-electrode plate 12 contains a positive-electrode active material, i.e., nickel hydroxide and/or nickel oxyhydroxide. For example, the nickel-zinc battery in a fully discharged state may contain nickel hydroxide as a positive-electrode active material. The nickel-zinc battery in a fully charged state may contain a positive-electrode active material or nickel oxyhydroxide. Nickel hydroxide and nickel oxyhydroxide are a common positive-electrode active materials used in nickel-zinc batteries and are typically in a particulate form. Nickel hydroxide or nickel oxyhydroxide may form a solid solution in the crystal lattice with an element other than nickel for an improvement in charge efficiency at high temperature. Examples of the element include zinc and cobalt. Nickel hydroxide or nickel oxyhydroxide may be mixed with a cobalt component. Examples of the cobalt component include a particulate metallic cobalt and a particulate cobalt oxide (e.g., cobalt monoxide). A particulate nickel hydroxide or nickel oxyhydroxide (which may form a solid solution with an element other than nickel) may be coated with a cobalt compound. Examples of the cobalt compound include cobalt monoxide, α-cobalt (II) hydroxide, β-cobalt (II) hydroxide, cobalt compounds having a valency of more than 2, and any combination thereof.

The positive-electrode plate 12 may contain an additional element besides the nickel hydroxide compound and the element that may form a solid solution with the compound. Examples of the additional element include scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), lutetium (Lu), hafnium (Hf), tantalum (Ta), tungsten (W), rhenium (Re), osmium (Os), iridium (Ir), platinum (Pt), gold (Au), mercury (Hg), and any combination thereof. Such an additional element may be contained in any form, such as an elemental metal or a metal compound (e.g., oxide, hydroxide, halide, or carbonate). The amount of the additional element (in the form of elemental metal or metal compound) is preferably 0.5 to 20 parts by weight, more preferably 2 to 5 parts by weight, relative to 100 parts by weight of the nickel hydroxide compound.

The positive-electrode plate 12 may be combined with the electrolytic solution to form a positive-electrode mixture. The positive-electrode mixture may contain the particulate nickel hydroxide compound, the electrolytic solution, and optionally an electrically conductive material (e.g., particulate carbon) or a binder.

The positive-electrode plate 12 may be wrapped with a non-woven fabric as desired. Preferably, the non-woven fabric is impregnated or impregnatable with an electrolyte containing an aqueous alkali metal hydroxide solution in this case. This can enhance the retention of the liquid of the electrolyte in the positive-electrode plate 12, resulting in an effective reaction in the positive electrode. This configuration can also prevent the detachment of the positive-electrode active material.

Negative-Electrode Plate

The negative-electrode plate 14 contains a negative-electrode active material, i.e., zinc and/or zinc oxide. The zinc may be contained in any form exhibiting electrochemical activity suitable for the negative electrode; for example, in the form of metallic zinc, a zinc compound, or a zinc alloy. Preferred examples of the negative electrode material include zinc oxide, metallic zinc, and calcium zincate. More preferred is a mixture of metallic zinc and zinc oxide. The negative-electrode active material may be in the form of a gel or may be combined with the electrolytic solution to form a negative-electrode mixture. For example, the negative electrode in the form of a gel may be readily prepared through addition of the electrolytic solution and a thickener to the negative-electrode active material. Examples of the thickener include poly(vinyl alcohol), poly(acrylic acid) salts, CMC, and alginic acid. Poly(acrylic acid) is preferred, which exhibits high resistance to a strong alkali.

The zinc alloy may be a non-amalgamated zinc alloy, i.e., a zinc alloy not containing mercury or lead. For example, a zinc alloy containing 0.01 to 0.06 mass % indium, 0.005 to 0.02 mass % bismuth, and 0.0035 to 0.015 mass % aluminum is preferred because of the effect of reducing the generation of hydrogen gas. In particular, indium and bismuth are advantageous in improving discharge performance. The use of a zinc alloy in the negative electrode retards the self-dissolution in the alkaline electrolytic solution, to reduce the generation of hydrogen gas, resulting in improved safety.

The negative electrode material may be in any form, but is preferably in a powdery form. The powdery negative electrode material has a large surface area and is adapted to a large current discharge. The negative electrode material (in the case of a zinc alloy) preferably has a mean particle size of 90 to 210 μm. The negative electrode material having such a mean particle size has a large surface area and thus is adapted to a large current discharge. In addition, the negative electrode material can be evenly mixed with the electrolytic solution or a gelling agent, and is readily handled during the assembly of the battery.

As described above, the negative-electrode plate 14 has the clearance area CL that does not overlap with the positive-electrode plate 12 over a predetermined width from the outer peripheral edge of the negative-electrode plate 14. The width W of the clearance area CL preferably ranges from 1 to 10 mm, more preferably ranges from 1 to 5 mm, more preferably ranges from 1 to 2 mm. The width W in any of such ranges can minimize the dead zone 14a that does not substantially contribute to the reaction in the negative electrode in the battery, in other words, can maximize the effective area of the negative electrode that contributes to the reaction in the negative-electrode plate 14 while effectively inhibiting zinc dendrites extending in pathways circumventing the resin frame 18.

The negative-electrode plate 14 may be wrapped with a non-woven fabric as desired. Preferably, the non-woven fabric is impregnated or impregnatable with an electrolyte containing an aqueous alkali metal hydroxide solution in this case. This can enhance the retention of the electrolyte in the negative-electrode plate 14 around the periphery, resulting in an effective reaction in the negative electrode. This configuration can also prevent the detachment of the negative-electrode active material.

Figure 3A:
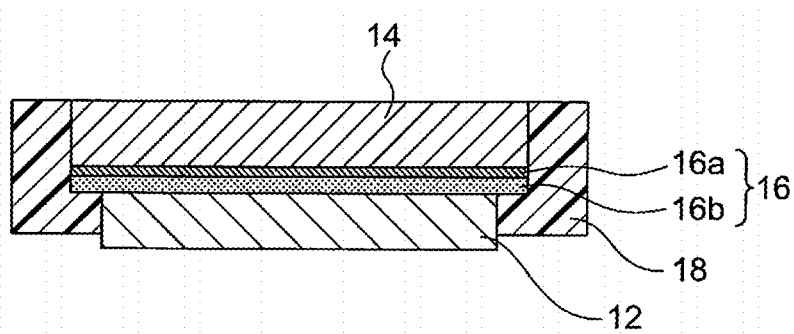
FIG. 3A is a schematic cross-sectional view of an electrode-separator assembly according to another embodiment of the present invention.
Figure 3B:
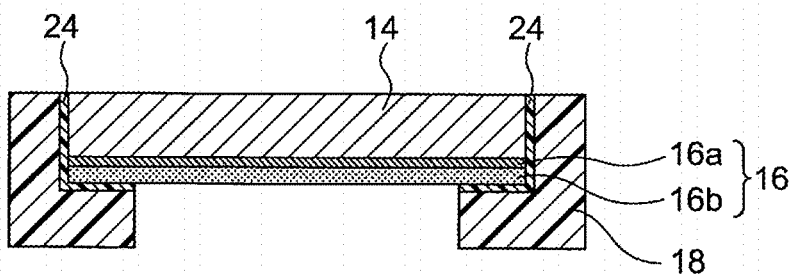
FIG. 3B is a schematic cross-sectional view of a separator-integrated negative electrode applicable to the electrode-separator assembly in FIG. 3A.

In accordance with a preferred embodiment of the present invention, the resin frame 18 extends along the thickness of the negative-electrode plate 14 so as to cover the peripheral end faces of the negative-electrode plate 14 as illustrated in FIG. 3A. Thus, the spaces can be substantially eliminated that may allow zinc dendrites to precipitate or extend on or around the peripheral end faces of the negative-electrode plate 14. As a result, this configuration can more effectively block the zinc dendrites that can extend from the peripheral end faces of the negative-electrode plate 14 toward the positive-electrode plate 12 via pathways circumventing the resin frame 18. In this embodiment, the negative-electrode plate 14 may be integrated with the LDH separator 16 and the resin frame 18 and be provided as a composite as illustrated in FIG. 3B. Preferably, the negative-electrode plate 14 is hermetically bonded to the resin frame 18 with an adhesive 24 and the LDH separator 16 is hermetically bonded to the resin frame 18 with the adhesive 24, in this case. The adhesive 24 can fill undesired voids that are inevitably produced between the members and even eliminate small spaces that may allow the marginal precipitation of zinc dendrites on the peripheral end faces of the negative-electrode plate 14, resulting in more certain restriction of the zinc dendrites from precipitating on the peripheral end faces of the negative-electrode plate 14. The adhesive 24 is preferably an epoxy-resin-based adhesive that specifically has an excellent alkaline resistance. Alternatively, the adhesive 24 may be a hot-melt adhesive.

Figure 4A:
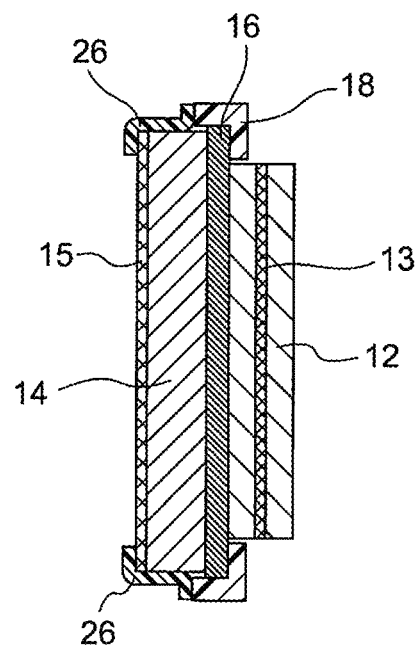
FIG. 4A is a schematic cross-sectional view of the electrode-separator assembly provided with a negative-electrode plate the end faces of which are sealed with adhesive tapes.
Figure 4B:
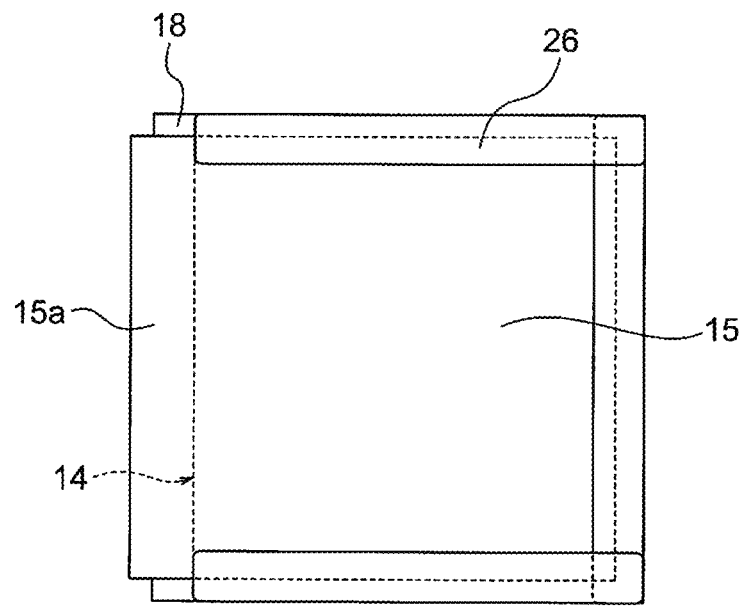
FIG. 4B is a schematic top view of the electrode-separator assembly seen from a negative-electrode collector in FIG. 4A.

In accordance with another embodiment of the present invention, the peripheral end faces of the negative-electrode plate 14 can be sealed with sealing members 26, for example, adhesive tapes as illustrated in FIGS. 4A and 4B. Thus, the spaces can be substantially eliminated that may allow zinc dendrites to precipitate or extend on or around the peripheral end faces of the negative-electrode plate 14, resulting in more effective restriction of the zinc dendrites that may extend from the peripheral end face of the negative-electrode plate 14 toward the positive-electrode plate 12 via pathways circumventing the resin frame 18. The sealing member 26 may be any commercially available adhesive tape provided with an adhesive on a resin film, for example, an adhesive tape provided with a special rubber adhesive with a thickness of 15 μm on a polypropylene film with a thickness of 30 μm (available from Teraoka Seisakusho Co., Ltd under the product number 466). The present embodiment has an advantage that the zinc dendrite restriction effect on the peripheral end faces of the negative-electrode plate 14 can be enhanced by a ready, low-cost approach of only affixing commercially available adhesive tapes onto the peripheral end faces of the negative-electrode plate 14.

Figure 5A:
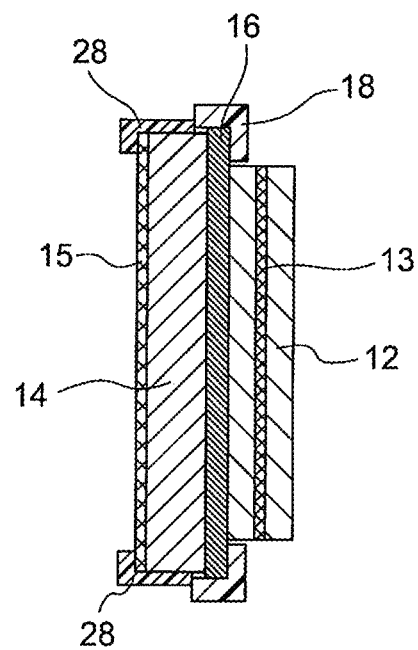
FIG. 5A is a schematic cross-sectional view of the electrode-separator assembly the end faces of which are sealed with an adhesive.
Figure 5B:
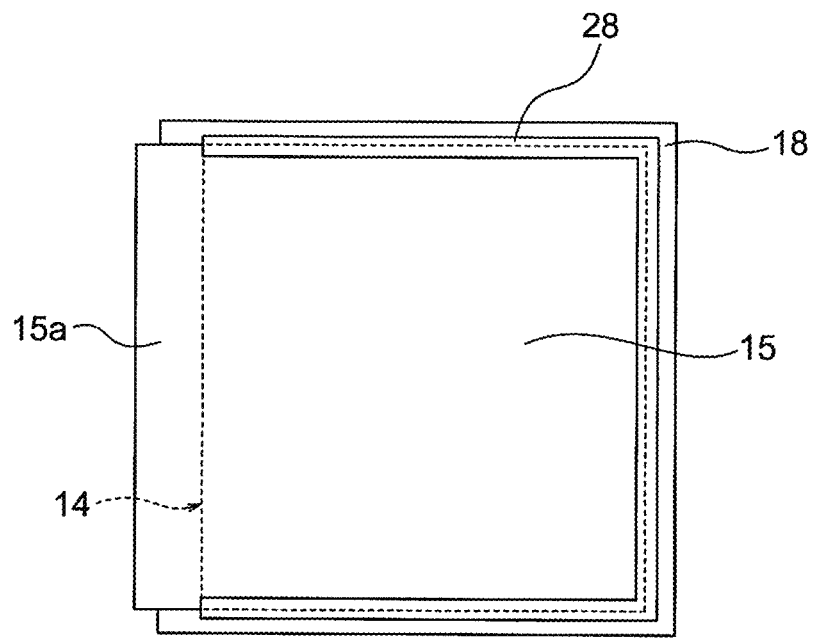
FIG. 5B is a schematic top view of the electrode-separator assembly seen from a negative-electrode collector in FIG. 5A.
Figure 6A:
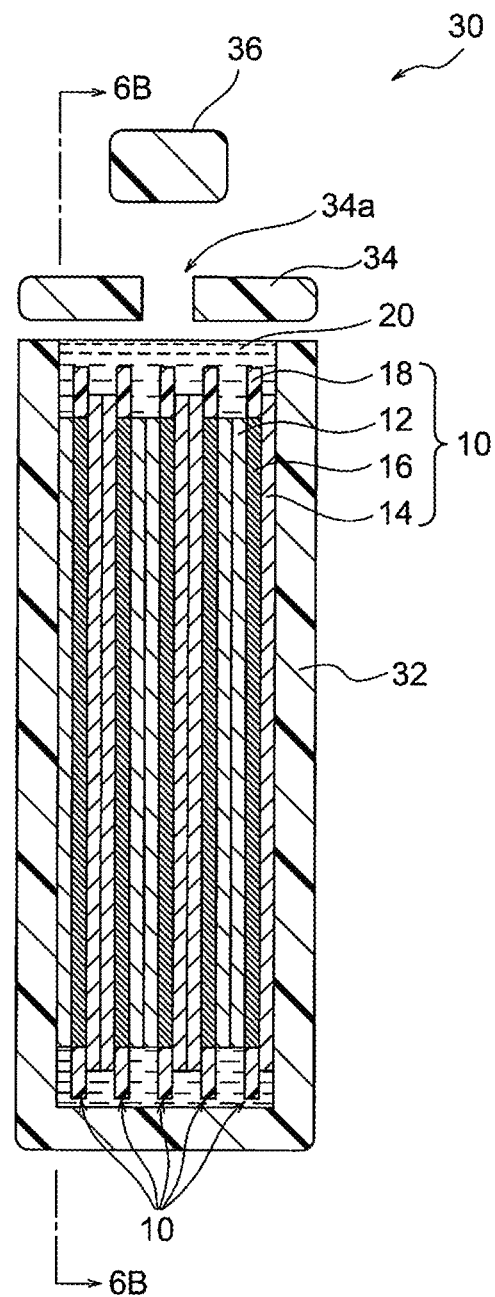
FIG. 6A is a schematic cross-sectional view of a nickel-zinc battery pack according to an embodiment of the present invention.
Figure 6B:
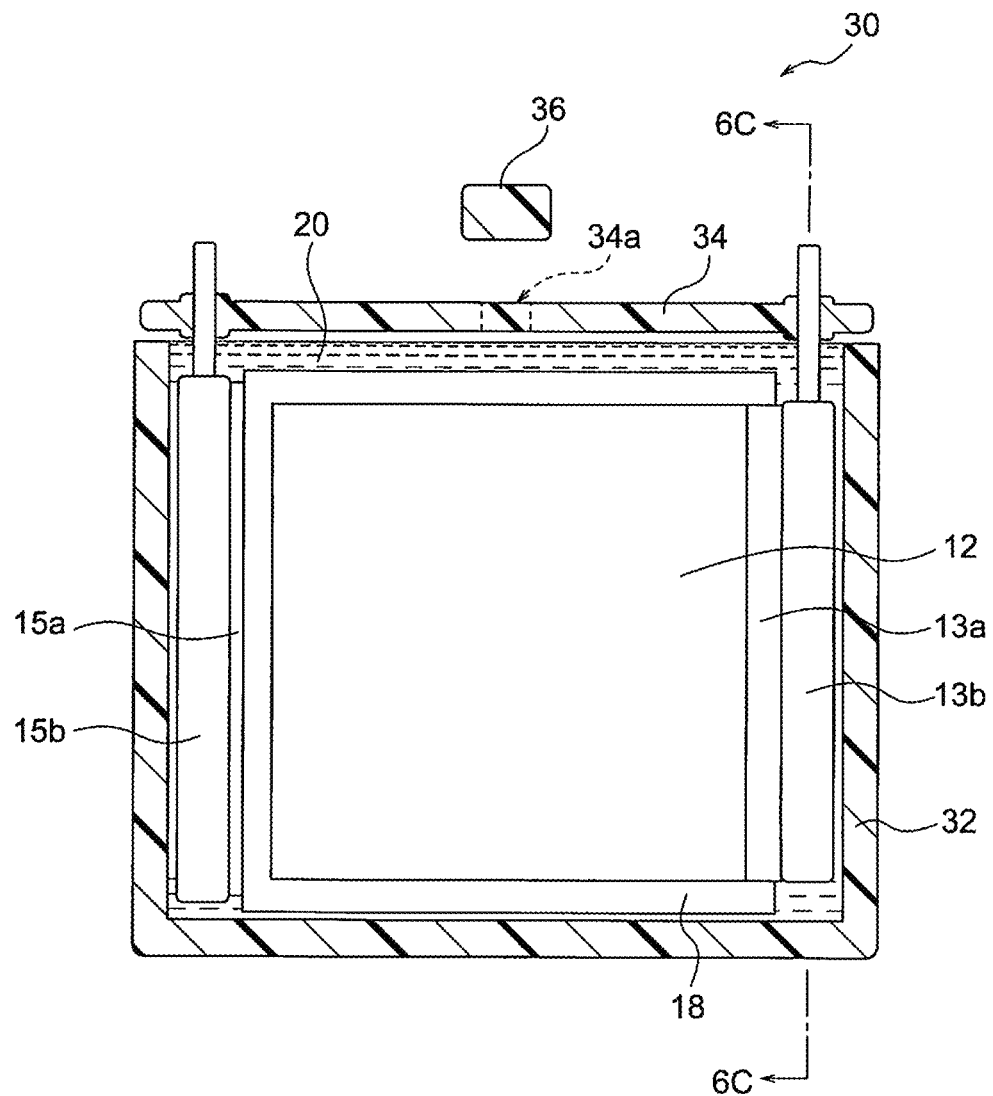
FIG. 6B is a cross-sectional view of the nickel-zinc battery taken along line 6B-6B in FIG. 6A.
Figure 6C:
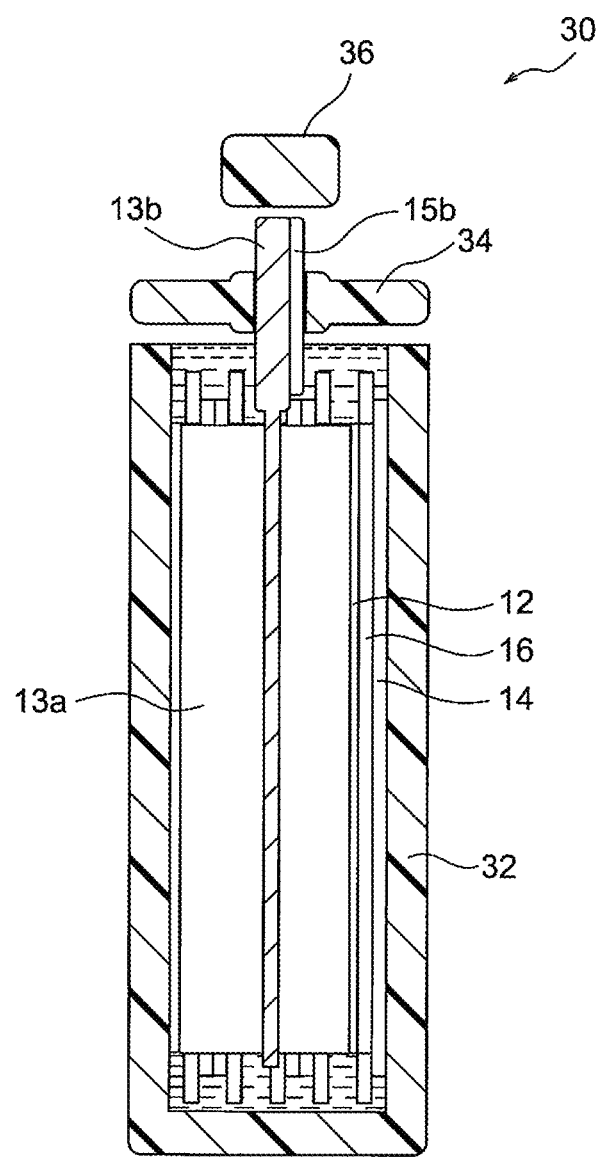
FIG. 6C is a cross-sectional view of the nickel-zinc battery taken along line 6C-6C in FIG. 6B.
Figure 6D:
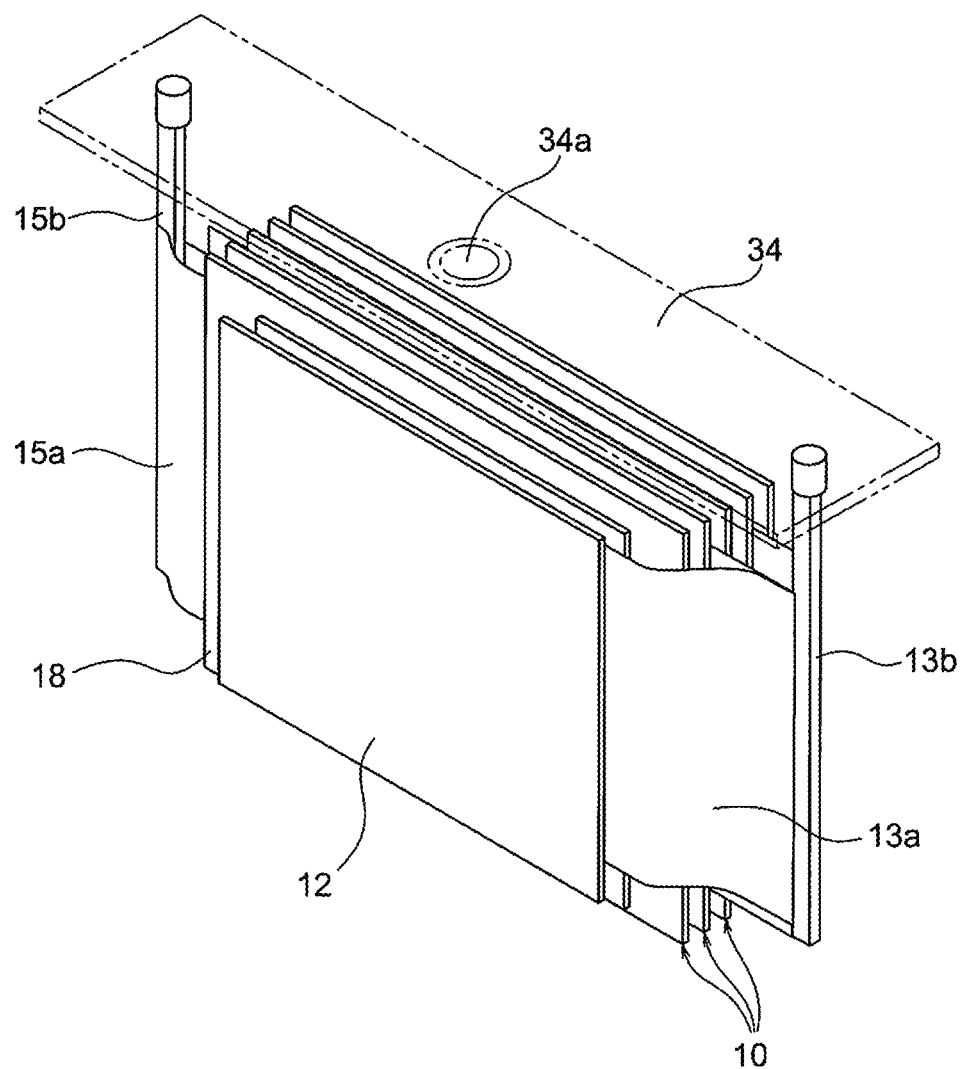
FIG. 6D is a perspective view of the internal structure of the nickel-zinc battery illustrated in FIGS. 6A to 6C where a resin container and an electrolyte are removed.

In accordance with still another preferred embodiment of the present invention, the peripheral end faces of the negative-electrode plate 14 can be sealed with an adhesive 28 as illustrated in FIGS. 5A and 5B. Thus, the spaces can be substantially eliminated that may allow zinc dendrites to precipitate or extend on or around the peripheral end faces of the negative-electrode plate 14, resulting in more effective restriction of the zinc dendrites that may extend from the peripheral end faces of the negative-electrode plate 14 toward the positive-electrode plate 12 via pathways circumventing the resin frame 18. The adhesive 28 is preferably an epoxy-resin-based adhesive that specifically has excellent alkaline resistance. Alternatively, the adhesive 28 may be a hot-melt adhesive. In accordance with the present embodiment, the adhesive 28 can fill undesired voids that are inevitably produced between the members and even eliminate small spaces that may allow the marginal precipitation of zinc dendrites on the peripheral end faces of the negative-electrode plate 14, resulting in more certain restriction of the zinc dendrites from precipitating on the peripheral end faces of the negative-electrode plate 14. The peripheral end faces of the negative-electrode plate 14 may be sealed with both the sealing members 26 and the adhesive 28. For example, parts of the peripheral end faces may be sealed with the sealing members 26 and the rest with the adhesive 28. The parts, sealed with the adhesive 28, of the peripheral end faces may be further provided with the sealing members 26.

Collector

As illustrated in FIGS. 4A to 6D, the positive-electrode plate 12 preferably includes a positive-electrode collector 13. The positive-electrode collector 13 more preferably has a positive-electrode collector tab 13a extending from one side of the outer periphery of the positive-electrode plate 12. The negative-electrode plate 14 preferably includes a negative-electrode collector 15. The negative-electrode collector 15 more preferably has a negative-electrode collector tab 15a extending from one side of the outer periphery of the negative-electrode plate 14. The positive-electrode collector tab 13a and the negative-electrode collector tab 15a preferably extend in opposite directions. A battery pack can be readily made thereby that has a high space efficiency and facilitates collection of power as illustrated in FIGS. 6A to 6D. Preferred examples of the positive-electrode collector include nickel porous substrates, such as foamed nickel plates. In such a case, a paste containing an electrode active material (e.g., nickel hydroxide) may be evenly applied onto a nickel porous substrate and then dried, to prepare a positive-electrode plate composed of the positive electrode on the positive-electrode collector. After the drying step, the positive-electrode plate (i.e., the positive electrode on the positive-electrode collector) is preferably subjected to pressing for the prevention of the detachment of the electrode active material or an improvement in electrode density. Preferred examples of the negative-electrode collector include punched copper sheets. In such a case, a mixture containing a zinc oxide powder and/or zinc powder and an optional binder (e.g., particulate polytetrafluoroethylene) may be applied onto a punched copper sheet to prepare a negative-electrode plate composed of the negative electrode on the negative-electrode collector. After the drying of the mixture, the negative-electrode plate (i.e., the negative electrode on the negative-electrode collector) is preferably subjected to pressing for the prevention of the detachment of the electrode active material or an improvement in electrode density.

LDH Separator

The LDH separator 16 contains a layered double hydroxide (LDH) and separates the positive-electrode plate 12 from the negative-electrode plate 14. The LDH separator 16 is capable of conducting hydroxide ions. In other words, the LDH separator 16 has a LDH containing layer serving as a hydroxide-ion-conductive separator. The LDH separator 16 is preferably gas-impermeable and/or water-impermeable. In other words, the LDH separator 16 has a LDH containing layer (hereinafter referred to as the "functional layer") which is preferably dense enough to be gas-impermeable and/or water-impermeable. The term "gas-impermeable" herein indicates that a tested object, for example, the LDH separator 16, exposed to helium gas at a differential pressure of 0.5 atm on one side of the LDH separator 16 blocks passage of the helium gas to the other side in water and thus no bubbles are generated, when the gas impermeability is evaluated by the test for evaluating the denseness employed in Evaluation 4 in Example 3 to be described below or a similar approach or scheme. The term "water-impermeable" herein indicates that water in contact with one side of the tested object, for example, the LDH separator, does not permeate through the LDH separator to the other side (see, for example, Patent Document 2). In other words, the gas-impermeable and/or water-impermeable LDH separator 16 has a high denseness that blocks gas or water and thus is not composed of a water-permeable porous film or any other porous material. Thus, the LDH separator 16 selectively permits the migration of hydroxide ions by means of its hydroxide ion conductivity and can serve as a battery separator. Hence, the LDH separator 16 has a highly effective configuration to physically restrict the penetration of the zinc dendrites formed during the charge mode through the separator and prevent the short circuit between the positive electrode and the negative electrode. It should be appreciated that the LDH separator 16 may be a composite with the porous substrate 16b as illustrated in FIG. 1. In any event, the hydroxide-ion-conductive LDH separator 16 permits the migration of hydroxide ions, which is required between the positive-electrode plate 12 and the negative-electrode plate 14. The LDH separator 16 can achieve reactions in the positive-electrode plate 12 and negative-electrode plate 14 during the charge and discharge modes.

The LDH separator 16 preferably has a He permeability per unit area of 10 cm/min·atm or less, more preferably 5.0 cm/min·atm or less, more preferably 1.0 cm/min·atm or less. The LDH separator having a He permeability within such a range has high denseness. Thus, the LDH separator having a He permeability of 10 cm/min·atm or less can be used as a separator in a secondary zinc battery to highly preclude the migration of substances other than hydroxide ions. For example, the LDH separator can effectively restrict the migration of zinc ions and/or zincate ions in the electrolyte. The restriction of the migration of the zinc ions and/or zincate ions through the LDH separator can effectively restrict the growth of the zinc dendrite in a secondary zinc battery by principle of operation. The He permeability is measured through a step of supplying a He gas to one side of the separator or functional layer to cause the He gas to pass through the separator or functional layer and a step of calculating the He permeability to evaluate the denseness of the separator or functional layer. The He permeability is calculated according to an expression $F/(P \times S)$, where F represents the volume of the passing He gas per unit time, P represents a differential pressure applied to the separator or functional layer during the passage of the He gas, and S represents a film area through which the He gas passes. The measured He permeability can provide a high level of evaluation of the denseness of the separator. For example, whether the separator has high denseness can be effectively evaluated. The separator having such high denseness blocks the migration of substances other than hydroxide ions, in particular, zinc ions and/or zincate ions causing growth of zinc dendrites, as much as possible or permits only an infinitesimal volume of such substances to migrate. The He gas has the smallest atomic size among gaseous atoms and molecules and has an extremely low reactivity. In other words, He atoms can be present in a gaseous form without constructing molecules. The He gas permeation rate defined by the expression above can be used for a simple and objective measure of the denseness regardless of differences in dimensions of samples and conditions for measurement. Whether the LDH separator has a high denseness suitable for use in a secondary zinc battery can thereby be evaluated in a simple, safe, and effective way. The He permeability can be measured in a preferred manner according to the steps in Evaluation 5 in Example 3, which will be described below.

The LDH separator 16 includes a layered double hydroxide (LDH). The LDH separator 16 typically includes a LDH membrane 16a and optionally a porous substrate 16b. The LDH membrane 16a is composed of a LDH. As is generally known, the LDH is composed of multiple hydroxide base layers and one or more intermediate layers between the hydroxide base layers. The hydroxide base layer is mainly composed of metal elements (typically metal ions) and OH groups. The intermediate layer of the LDH is composed of anions and $H_2O$. The anions are monovalent or multivalent and are preferably monovalent or divalent. The anions in the LDH preferably include $OH^-$ and/or $CO_3^{2-}$. The LDH has an excellent ion conductivity attributed to its inherent properties.

The known LDH is generally represented by the basic formula $M^{2+}_{1-x}M^{3+}_{x}(OH)_2A^{n-}_{x/n}\cdot mH_2O$, where $M^{2+}$ is a divalent cation, $M^{3+}$ is a trivalent cation, $A^{n-}$ is an n-valent anion, n is an integer of 1 or more, x ranges from 0.1 to 0.4, and m is 0 or more. In this basic formula, $M^{2+}$ may be any divalent cation. Preferred examples of such a cation include $Mg^{2+}$, $Ca^{2+}$ and $Zn^{2+}$. A more preferred example is $Mg^{2+}$. $M^{3+}$ may be any trivalent cation. Preferred examples of such a cation include $Al^{3+}$ and $Cr^{3+}$. A more preferred example is $Al^{3}$. $A^{n-}$ may be any anion. Preferred examples of such an anion include $OH^-$ and $CO_3^{2-}$. In the basic formula, $M^{2+}$ preferably includes $Mg^{2+}$. $M^{3+}$ preferably includes $Al^{3+}$. $A^{n-}$ preferably includes $OH^-$ and/or $CO_3^{2-}$. In the formula, n is an integer of 1 or more and is preferably 1 or 2; x ranges from 0.1 to 0.4, preferably ranges from 0.2 to 0.35; and m is any number that indicates the molar number of the water where m is a real number of 0 or more, typically a real number above 0, preferably 1 or more. It should be noted that the basic formula is an exemplary representation of the LDH. The ion species in the formula may be appropriately replaced with any other ion species. For example, the $M^{3+}$ ions may be at least partly replaced with quadrivalent or higher valent cations in the basic formula. In such a case, the coefficient x/n of the anion $A^{n-}$ in the formula may be appropriately varied.

The LDH separator 16 is preferably integrated with the porous substrate 16b. In other words, the LDH separator 16 may be a composite material including the LDH membrane 16a and the porous substrate 16b. Alternatively, the LDH separator 16 may be a composite of the porous substrate 16b with pores filled with a LDH, where the LDH membrane 16a may be omitted. Alternatively, the combination of the LDH membrane 16a and the porous substrate 16b may be employed. In other words, part of the LDH membrane 16a may be embedded in the pores of the porous substrate 16b. In this case, the functional layer serving as a separator is composed of the LDH membrane 16a and a composite portion consisting of the LDH and the porous substrate 16b.

A typical LDH separator 16 includes a LDH membrane 16a and a porous substrate 16b supporting the LDH membrane 16a. For example, the porous substrate(s) 16b may be provided on one face or two faces of the LDH membrane 16a. In the case that the porous substrate 16b is provided on one face of the LDH membrane 16a, the porous substrate 16b may be provided on a face adjacent to the negative-electrode plate 14 or the other face adjacent to the positive-electrode plate 12. The porous substrate 16b is water-permeable and thus permits the electrolyte 20 to reach the LDH membrane 16a. The porous substrate 16b enables the LDH separator 16 (specifically, the LDH membrane 16a) to stably hold hydroxide ions. The porous substrate 16b can reinforce the LDH membrane 16a, resulting in reductions in thickness and resistance of the LDH membrane 16a. The porous substrate 16b may be provided with a dense LDH membrane or layer thereon or therein. A porous substrate 16b may be provided on one face of the LDH membrane 16a through preparation of the porous substrate 16b and formation of a LDH membrane on the porous substrate 16b. Alternatively, two porous substrates 16b are provided on the respective faces of the LDH membrane 16a through holding and densifying powdered LDH material between these porous substrates 16b.

In the case that the porous substrate 16b is provided on one face of the LDH membrane 16a, the LDH membrane 16a may be disposed adjacent to either the positive-electrode plate 12 or the negative-electrode plate 14. Preferably, the LDH membrane 16a is disposed adjacent to the negative-electrode plate 14. This can more effectively restrict the detachment of the LDH membrane 16a from the porous substrate 16b. In other words, the stress that may be generated by the growth of zinc dendrites on the negative-electrode plate 14 urges the LDH membrane 16a to the porous substrate 16b. As a result, the LDH membrane 16a is less detachable from the porous substrate 16b.

The porous substrate 16b is preferably composed of at least one selected from the group consisting of ceramic, metal, and polymer materials, more preferably of a ceramic material and/or a polymer material, and more preferably of a polymer material. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina and zirconia. Most preferred is alumina. The use of such a porous ceramic material facilitates the formation of a highly-densified LDH separator 16. Preferred examples of the metal material include aluminum, zinc, and nickel. Preferred examples of the polymer material include polystyrene, polyether sulfone, polypropylene, epoxy resins, polyphenylene sulfide, hydrophilized fluorinated resins (e.g., poly(tetrafluoroethylene) (PTFE)), cellulose, nylon, polyethylene, and any combination thereof. More preferably, any material having alkali resistance (i.e., resistance to an electrolytic solution of a battery) is appropriately selected from among these preferred materials.

The LDH separator 16 preferably includes a LDH membrane 16a composed of an aggregate of multiple platy LDH particles. The platy LDH particles are oriented vertical or oblique to the face of the porous substrate 16b (the main face of the porous substrate in the macroscopic observation of the porous substrate where fine irregularities arising from the porous structure can be ignored). The LDH membrane 16a may be at least partially embedded in the pores of the porous substrate 16b. In this case, the platy LDH particles can be present in the pores of the porous substrate 16b. LDH crystals are known to have a form of layered platy particles. The vertical or oblique orientation of the platy LDH particles is very advantageous for the LDH separator 16. The oriented platy LDH particles in the LDH separator have an anisotropic hydroxide ion conductivity where the hydroxide ion conductivity in the orientated direction (i.e., the direction parallel to the LDH layer) is much higher than that in the direction vertical to the orientated direction. Indeed, an oriented LDH bulk is known to have a conductivity (S/cm) in the orientated direction one digit higher than that in the direction vertical to the orientated direction. In other words, the vertical or oblique orientation described above educes a maximum or significant anisotropic conductivity of the oriented platy LDH particles along the thickness of the layer (i.e., in the direction vertical to the face of the LDH membrane 16a or the porous substrate 16b), resulting in a maximum or significant increase in the conductivity along the thickness of the layer. The LDH membrane 16a achieves a reduced resistance compared to the LDH bulk. The LDH membrane 16a having such an orientation facilitates the migration of hydroxide ions through the thickness.

The LDH membrane 16a preferably has a thickness of 100 μm or less, more preferably 75 μm or less, more preferably 50 μm or less, particularly preferably 25 μm or less, and most preferably 5 μm or less. Such a thin LDH separator 16 has low resistance. Such a thicknesses can achieve desired resistances appropriate to practical applications, for example, batteries. The lower limit of the thickness of the LDH membrane 16a differs depending on the application and thus is not determined. In order to keep the level of hardness desired for a functional layer, for example, a separator, the LDH membrane 16a preferably has a thickness of 1 μm and more preferably 2 μm.

The LDH separator 16, for example, the LDH separator 16 composite with the porous substrate 16b, can be produced by any method. The LDH separator 16 can be produced by a known method (see, for example, Patent Documents 1 and 2).

Resin Frame

The resin frame 18 has an opening in which the LDH separator 16 and the positive-electrode plate 12 are fitted or joined. The resin frame 18 can reinforce the ends of the LDH separator 16 and thus prevent damage to the ends of the LDH separator 16, which enhances the reliability and facilitates the handling of the LDH separator 16. The assembly of the nickel-zinc battery is thereby facilitated. The resin frame 18 itself can help restrict the penetration and extension of zinc dendrites. The resin frame 18 is more preferably fixed to the LDH separator 16 with an adhesive. The adhesive is preferably an epoxy bonding agent that has high alkaline resistance. Alternatively, the adhesive may be a hot-melt adhesive. In any event, liquid tightness should be maintained at the contact points of the LDH separator 16 with the resin frame 18. The resin frame 18 is preferably made of a resin having a resistance to alkali metal hydroxides, such as potassium hydroxide, more preferably polyolefin resin, ABS resin, PP resin, PE resin, or modified polyphenylene ether, and most preferably ABS resin, PP resin, PE resin, or modified polyphenylene ether.

In a preferred embodiment of the present invention, the resin frame 18 includes a main segment 18a having an opening that can accommodate the LDH separator 16 and an inward extension 18b extending from the ends of the main segment 18a to the opening, and/or a neighborhood thereof, adjacent to the positive-electrode plate 12. The LDH separator 16 (for example, the porous substrate 16b) is engaged with the inward extension 18b. In this manner, the resin frame 18 blocks the peripheral end faces of the LDH separator 16 and the portions of the LDH separator 16 corresponding to the clearance area CL on the face adjacent to the positive-electrode plate 12. The LDH separator 16 is preferably hermetically joined to the resin frame 18 (that is, to the main segment 18a and the inward extension 18b) with the adhesive as described above.

Nickel-Zinc Battery

Figure 10:
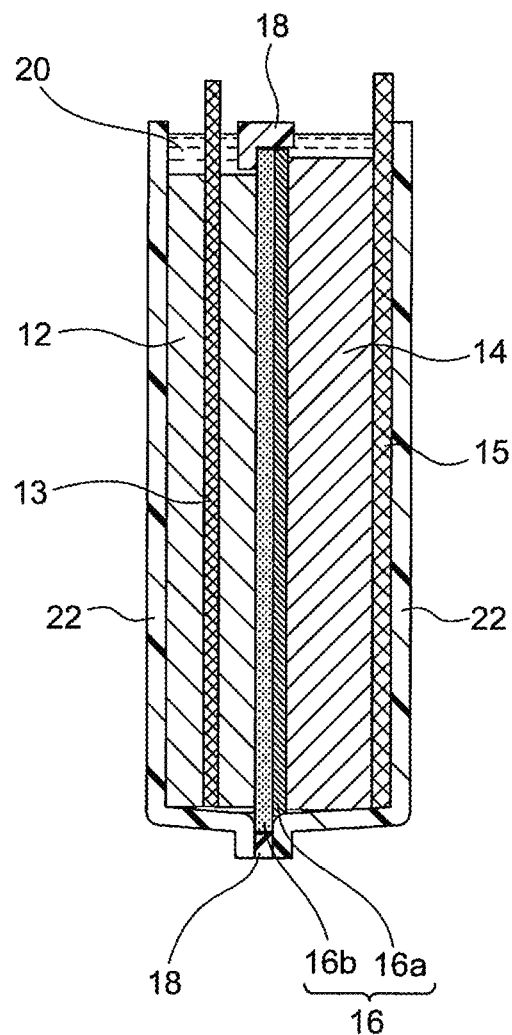
FIG. 10 is a schematic cross-sectional view of a nickel-zinc battery to be mentioned in Example 2 (comparative) for reference where a positive-electrode chamber is completely separated from a negative-electrode chamber.

As described above, the electrode-separator assembly according to the present invention is used in a nickel-zinc battery and, in particular, in a secondary nickel-zinc battery. FIGS. 6A to 6D illustrate a nickel-zinc battery 30 including electrode-separator assemblies 10. The nickel-zinc battery 30 includes a resin container 32 and the electrode-separator assemblies 10 accommodated in the resin container 32, and contains an electrolyte 20. As described above, the electrode-separator assembly 10 permits the common electrolyte 20 to be used without separation of the positive-electrode chamber from the negative-electrode chamber. In other words, the short circuit caused by the zinc dendrites between the positive electrode and the negative electrode in the nickel-zinc battery 30 can be effectively restricted without the complete separation of the positive-electrode chamber from the negative-electrode chamber. This configuration can omit the hermetical joining of an exterior member 22 (such as a resin film) to the resin frame 18 by thermal bonding for the complete separation of the positive-electrode chamber from the negative-electrode chamber to block fluid communication therebetween as illustrated in FIG. 10.

A particularly preferred embodiment of the nickel-zinc battery including an electrode-separator assembly according to the present invention is a nickel-zinc battery pack. The advantage described above provides a particularly great benefit in the assembly of the nickel-zinc battery pack. In the case of traditional battery packs, the troublesome joining work described above must be repeated with every unit cell. Furthermore, a nozzle must be inserted into all the positive and negative-electrode chambers for the injection of an electrolyte. In contrast, the nickel-zinc battery pack including the electrode-separator assemblies 10 can eliminate such troublesome work. Thus, the electrode-separator assembly 10 can drastically facilitate the assembly of a LDH separator-equipped nickel-zinc battery (especially a nickel-zinc battery pack) without the work, structure, or components for the complete separation of the positive-electrode chamber from the negative-electrode chamber.

FIGS. 6A to 6D illustrate an assembled nickel-zinc battery 30, which is a battery pack. The nickel-zinc battery 30 includes a resin container 32 and electrode-separator assemblies 10, and contains an electrolyte 20. The electrode-separator assemblies 10 are directly disposed in parallel to each other without partition walls in the resin container 32. The electrode-separator assemblies 10 may be alternatingly disposed in the opposite directions and accommodated in the resin container 32 such that a positive-electrode plate 12 is in contact with the adjacent positive-electrode plate 12, and a negative-electrode plate 14 is in contact with the adjacent negative-electrode plate 14, in the electrode-separator assemblies 10. Thus, the electrolyte 20 can be injected into the resin container 32 without any work for the separation of the positive-electrode chamber from the negative-electrode chamber. In other words, the major portion of the battery pack can be assembled by the simple arrangement of the electrode-separator assemblies 10 without, for example, partitioning films.

As described above with reference to FIGS. 4A to 6D, the positive-electrode plate 12 preferably includes the positive-electrode collector 13. The positive-electrode collector 13 preferably has a positive-electrode collector tab 13a extending from one side of the outer periphery of the positive-electrode plate 12. The negative-electrode plate 14 preferably includes the negative-electrode collector 15. The negative-electrode collector 15 preferably has a negative-electrode collector tab 15a extending from the side of the outer periphery of the negative-electrode plate 14. The positive-electrode collector tab 13a and the negative-electrode collector tab 15a preferably extend in opposite directions. Such a configuration facilitates production of a battery pack that has a high packaging density and facilitates the collection of power as illustrated in FIGS. 6A to 6D. For example, multiple positive-electrode collector tabs 13a may be connected to one positive-electrode collector terminal 13b. Multiple negative-electrode collector tabs 15a may be connected to one negative-electrode collector terminal 15b. The positive-electrode collector terminal 13b and the negative-electrode collector terminal 15b may be disposed at opposite sides of the resin container 32.

The resin container 32 is preferably open-topped and the open top is sealed by a seal plate 34. A typical seal plate 34 has a liquid inlet 34a, through which the electrolyte can be injected into the resin container 32. A dismountable pressure discharge valve 36 is preferably disposed at the liquid inlet 34a. After the electrolyte 20 is injected, the liquid inlet 34a is closed by the pressure discharge valve 36. The seal plate 34 may be integrated with the positive-electrode collector terminal 13b and the negative-electrode collector terminal 15b.

The electrolyte 20 contains an aqueous alkali metal hydroxide solution. Examples of the alkali metal hydroxide include potassium hydroxide, sodium hydroxide, lithium hydroxide, and ammonium hydroxide. Potassium hydroxide is more preferred. In order to restrict self-dissolution of zinc and/or zinc oxide, a zinc compound, such as zinc oxide or zinc hydroxide, may be added to the electrolyte. As described above, the electrolyte 20 may be mixed with a positive-electrode active material and/or a negative-electrode active material and may be provided in the form of a positive-electrode mixture and/or a negative-electrode mixture. The electrolyte may be gelated for prevention of leakage of the electrolyte. Examples of the preferred gelling agent include polymers, such as polyethylene oxide, polyvinyl alcohol, polyacrylamide, and starch that can absorb the solvent of the electrolyte.

EXAMPLES

The present invention will be more specifically described by the following examples.

Example 1

Figure 7:
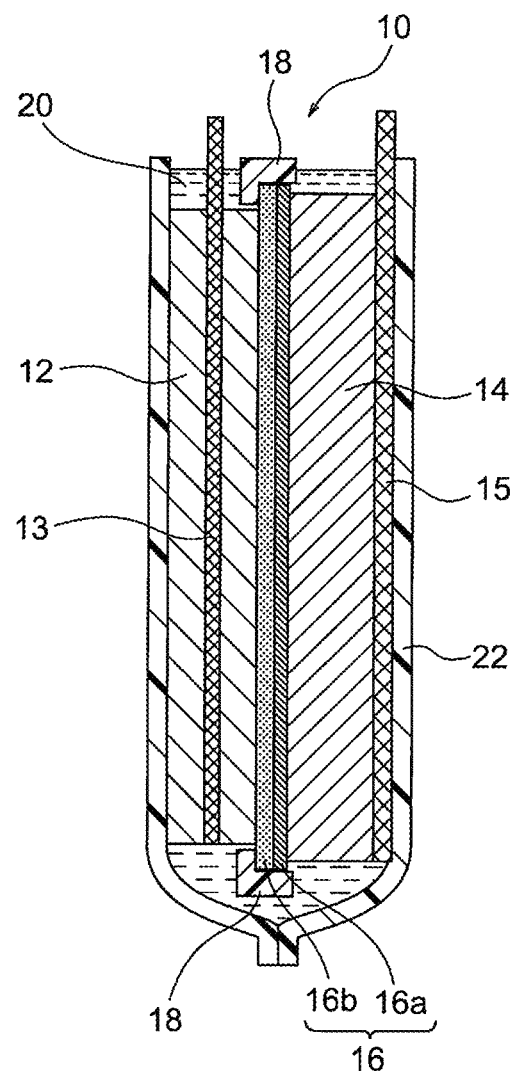
FIG. 7 is a schematic cross-sectional view of a nickel-zinc battery made in Example 1.

An electrode-separator assembly and a nickel-zinc battery as illustrated in FIG. 7 were prepared and evaluated as follows:

(1) Preparation of Positive-Electrode Plate

Fine pores in a nickel foam sheet, which is a positive-electrode collector 13, were filled with a paste containing an electrode active material, such as nickel hydroxide. The nickel foam sheet filled with the active material was dried, rolled, and then cut into a square positive-electrode plate 12 (93 mm by 93 mm).

(2) Preparation of Negative-Electrode Plate

A mixture of powdered zinc oxide (80 parts by weight), powdered zinc (20 parts by weight), and polytetrafluoroethylene particles (3 parts by weight) was applied to a negative-electrode collector 15 consisting of a copper mesh. A square negative-electrode plate 14 (100 mm by 100 mm) was prepared that had a porosity of about 50% where an active material was applied over a predetermined area.

(3) Preparation of LDH Separator with Outer Frame

A gas-impermeable and water-impermeable dense LDH membrane 16a was formed on one face of a porous alumina substrate 16b by a known technique. A square LDH separator 16 (100 mm by 100 mm) was prepared that was a composite with the porous substrate 16b. A resin frame 18 was provided that was composed of a modified polyphenylene ether resin (m-PPE) and had an opening with an area of 95 mm by 95 mm. The resin flame 18 had a stepped-shape depressed portion that was formed as an inward flange along the outer peripheral edge of the opening so as to enclose a region of about 100 mm by 100 mm (including the opening). The inward flange was joined to the LDH separator 16 such that the porous substrate 16b was in contact with the inward flange. A commercially available epoxy-based adhesive was applied between the LDH separator 16 and the joined inward flange, resulting in a liquid-tight seal.

(4) Preparation of Electrode-Separator Laminate and Nickel-Zinc Battery

The positive-electrode plate 12 was fitted to the opening in the resin frame 18 to come in contact with the porous substrate 16b while the negative-electrode plate 14 overlaid the LDH membrane 16a of the LDH separator 16. The clearance area CL of the negative-electrode plate 14, which did not overlap with the positive-electrode plate 12, was determined to have a width W of 3.5 mm. An electrode-separator assembly 10 assembled in this manner was accommodated into a flexible pack consisting of an exterior member 22 composed of a laminated film. An electrolyte 20 or an aqueous KOH solution was injected into the flexible pack. The positive-electrode plate 12, the negative-electrode plate 14, and the LDH separator 16 were sufficiently impregnated with the electrolyte 20. A nickel-zinc battery was prepared thereby.

(5) Evaluation of Nickel-Zinc Battery

Figure 8:
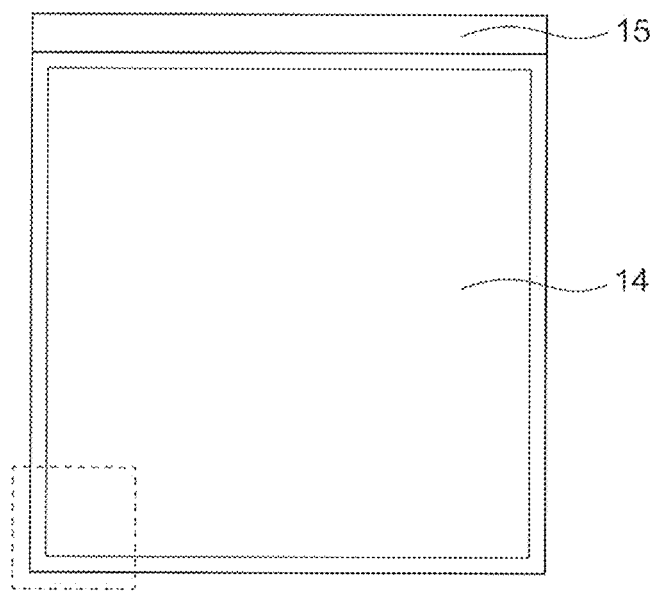
FIG. 8 is a schematic top view of the state of a negative-electrode plate made and subjected to charge and discharge cycles in Example 1.
Figure 9:
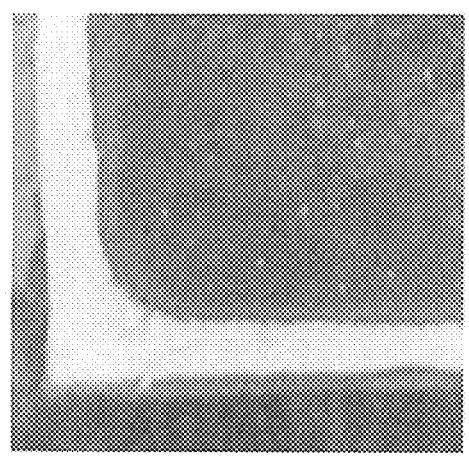
FIG. 9 is a photograph taken from the negative-electrode plate made and subjected to the charge and discharge cycles in Example 1.

The prepared nickel-zinc battery was subjected to four cycles of charge and discharge operations at a current density of 25 mA/cm$^2$. The negative-electrode plate 14 was subsequently observed. A black tarnish caused by the precipitated zinc was observed in the square area of the negative-electrode plate 14 facing the positive-electrode plate 12 whereas no black tarnish was observed in the edge of the negative-electrode plate 14 (i.e., the area corresponding to the clearance area CL of the positive-electrode plate 12) and the edge remained white, as illustrated in FIG. 9. The photograph in FIG. 9 was taken from a squared portion of the negative-electrode plate 14 illustrated in FIG. 8. As is apparent from these results, the edge of the negative-electrode plate 14 (in other words, the area corresponding to the clearance area CL of the positive-electrode plate 12) did not react and had no precipitated zinc dendrites. Thus, the short circuit caused by the zinc dendrites between the positive electrode and the negative electrode in the nickel-zinc battery can be effectively restricted even if the positive-electrode chamber is not completely separated from the negative-electrode chamber, unlike Example 2, which will be described below.

Example 2 (Comparative)

An electrode-separator assembly, and a nickel-zinc battery including the electrode-separator assembly, were prepared as in Example 1 except that a) the positive-electrode plate had a size of 40 mm by 40 mm, b) the negative-electrode plate had a size of 40 mm by 40 mm, and c) the resin frame was shaped so as to be combinable with the positive-electrode plate and the negative-electrode plate. The resulting nickel-zinc battery was subjected to repeated charge and discharge cycles at a current density of 8.3 mA/cm$^2$. As a result, a large amount of precipitated zinc was observed on the negative-electrode plate 14 in the fourth cycle. After the tenth cycle, zinc dendrites grew and reached the positive-electrode plate 12 around the resin frame 18, which caused the short circuit between the positive electrode and the negative electrode.

As illustrated in FIG. 10, such a short circuit can be prevented by the hermetical joining of the resin frame 18 to the exterior member 22 and the complete separation of the positive-electrode chamber from the negative-electrode chamber to block fluid communication therebetween. In the present invention, the short circuit caused by the zinc dendrites between the positive electrode and the negative electrode in the nickel-zinc battery can be effectively restricted without the complete separation of the positive-electrode chamber from the negative-electrode chamber. In other words, the electrode-separator assembly according to the present invention can drastically facilitate assembly of a LDH separator-equipped nickel-zinc battery (especially a nickel-zinc battery pack) including a LDH separator without the work, structure, and components for the complete separation of the positive-electrode chamber from the negative-electrode chamber.

Example 3 (Reference)

A functional layer containing LDH and a composite material were prepared and evaluated in accordance with the following steps. The functional layer in this example has a LDH membrane and LDH in a porous substrate. The composite material in this example corresponds to the LDH separator.

(1) Preparation of Porous Substrate

A powdered alumina (100 parts by weight) (AES-12 available from Sumitomo Chemical Co., Ltd.) was mixed with a dispersion medium (70 parts by weight) (xylene:butanol=1:1), binder (11.1 parts by weight) (polyvinyl butyral BM-2 available from Sekisui Chemical Co., Ltd), plasticizer (5.5 parts by weight) (DOP available from Kurogane Kasei Co., Ltd.), and dispersant (2.9 parts by weight) (RHEODOL SP-030 available from Kao Corporation). This mixture was defoamed through agitation under reduced pressure to yield a slurry. The slurry was shaped into a sheet on a polyethylene terephthalate film with a tape shaping machine to yield a green sheet having a dried thickness of 220 μm. The green sheet was cut into a size of 2.0 cm×2.0 cm×0.022 cm and fired at 1300° C. for two hours to yield a porous alumina substrate.

The porosity of the yielded porous substrate was measured by the Archimedean method. The porous substrate had a porosity of 40%.

The average pore size of the porous substrate was 0.3 μm. In the present invention, the average pore size was determined by measuring the largest length of each pore in a scanning electron microscopic (SEM) image of the surface of the porous substrate. The magnification of the scanning electron microscopic (SEM) image used in this measurement was 20,000. All the measured pore sizes were listed in order of size to calculate the average, from which the subsequent 15 larger sizes and the subsequent 15 smaller sizes, i.e., 30 sizes in total, were selected in one field of view. The average was determined for two fields of view. The pore sizes were measured by, for example, a length-measuring function of SEM software.

(2) Spin Coating with Polystyrene and Sulfonation

A polystyrene substrate (0.6 g) was dissolved in a xylene solution (10 mL) to prepare a spin coat solution with a polystyrene concentration of 0.06 g/mL. The resulting spin coat solution (0.1 mL) was applied dropwise and spin-coated on a porous alumina substrate at a rotation rate of 8000 rpm. The spin coating was continued for 200 seconds including dropwise application and drying. The porous substrate coated with the spin coat solution was sulfonated in 95% sulfuric acid at 25° C. for four days.

(3) Preparation of Aqueous Raw Material Solution

Magnesium nitrate hexahydrate ($Mg(NO_3)_2 \cdot 6H_2O$), manufactured by Kanto Chemical CO., Inc.), aluminum nitrate nonahydrate ($Al(NO_3)_3 \cdot 9H_2O$, manufactured by Kanto Chemical CO., Inc.), and urea (($NH_2)_2CO$, manufactured by Sigma-Aldrich Corporation) were provided as raw materials. The magnesium nitrate hexahydrate and aluminum nitrate nonahydrate were weighed such that a cation ratio ($Mg^{2+}/Al^{3+}$) was 2 and a molar concentration of the total metal ions ($Mg^{2+}+Al^{3+}$) was 0.320 mol/L, and placed in a beaker. Ion-exchanged water was added thereto into a total amount of 70 mL. After stirring the solution, the urea weighed at a urea/$NO_3^-$=4 was added, and further stirred to yield an aqueous raw material solution.

(4) Formation of Film by Hydrothermal Treatment

The aqueous raw material solution prepared in Procedure (3) and the substrate prepared in Procedure (2) were placed in a sealed Teflon™ autoclave (having an internal volume of 100 mL, and covered with stainless steel jacket). The substrate was horizontally fixed away from the bottom of Teflon™ autoclave such that the solution was in contact with the two surfaces of the substrate. A LDH membrane was then formed on the surface of the substrate by a hydrothermal treatment at a temperature of 70° C. for 168 hours (or seven days). After a predetermined period, the substrate was removed from the autoclave, washed with ion-exchanged water, and dried at 70° C. for ten hours to give a LDH containing a functional layer partly embedded in the porous substrate. The thickness of the functional layer was about 3 μm (including the thickness of the portion embedded in the porous substrate).

(5) Results of Evaluation

The resultant functional layer and composite material were evaluated as follows:

Evaluation 1: Identification of Functional Layer

The crystalline phase of the functional layer was evaluated by an X-ray diffractometer (XRD: RINT TTR III available from Rigaku Corporation) under the conditions: a voltage of 50 kV, a current of 300 mA, and an angular range from 100 to 700 to obtain an XRD profile. In a comparison of the resulting XRD profile with the diffraction peaks of LDHs (hydrotalcite compounds) described in JCPDS Card No. 35-0964, the functional layer was identified as a LDH (hydrotalcite compound).

Evaluation 2: Observation of Microstructure

Figure 11A:
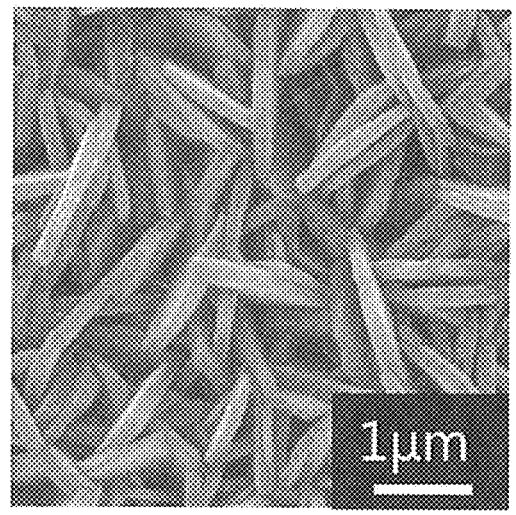
FIG. 11A is a scanning electron microscope (SEM) image showing the surface microstructure of a functional layer made in Example 3.
Figure 11B:
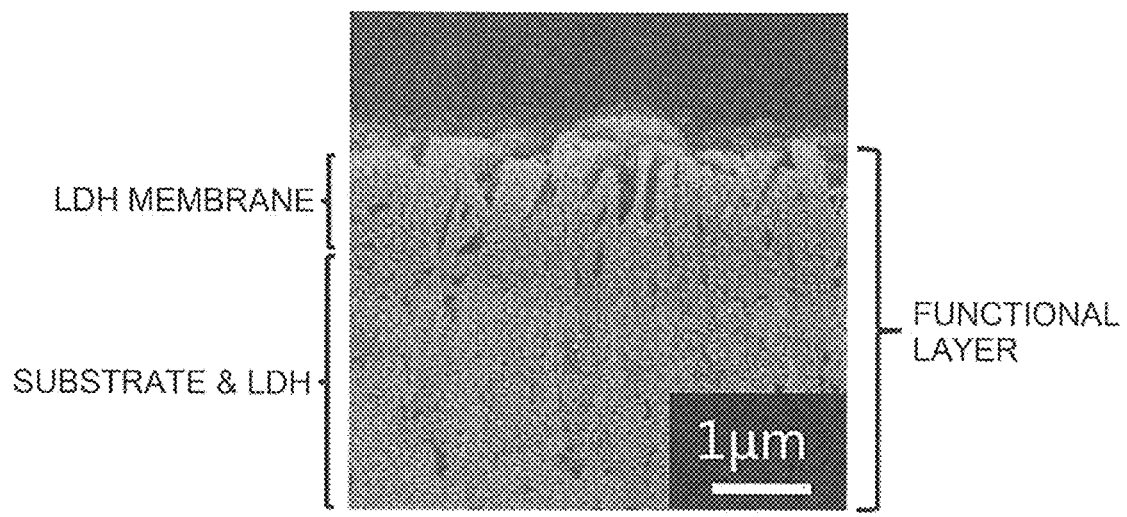
FIG. 11B is a SEM image showing the cross-sectional microstructure of the functional layer made in Example 3.

The surface microstructure of the functional layer was observed at an accelerating voltage ranging from 10 kV to 20 kV with a scanning electron microscope (SEM: JSM-6610LV available from JEOL Ltd.). A cross-sectional face of the functional layer composed of a LDH membrane and a composite portion consisting of LDH and the substrate was polished with an ion milling device (IM4000 available from Hitachi High-Technologies Corporation). The microstructure of the polished cross-section was observed with the SEM under the same conditions as those for the observation of the surface microstructure. The SEM images of the surface microstructure and the polished cross-sectional microstructure of the functional layer are shown in FIGS. 11A and 11B, respectively. FIG. 11B demonstrates that the functional layer is composed of a LDH membrane and a composite portion consisting of LDH and the porous substrate that underlay the LDH membrane. The LDH contained in the LDH membrane was composed of aggregates of platy LDH particles. The platy particles were oriented vertical or oblique to the face of the porous substrate (the main face of the porous substrate in macroscopic observation of the porous substrate where fine irregularities arising from the porous structure can be ignored). The pores of the porous substrate were filled with LDH and the composite portion was a dense layer.

Evaluation 3: Elemental Analysis by EDS

The functional layer (composed of the LDH membrane and the composite portion consisting of LDH and the substrate) was polished with a cross-section polisher (CP) for observation of the polished cross-section. A cross-sectional image of the functional layer (composed of the LDH membrane and the composite portion consisting of the LDH and a substrate) in one field was taken at a magnification of 10000-fold with a field emission-scanning electron microscope (FE-SEM: ULTRA55 available from Carl Zeiss). The elements in the LDH membrane on the face of the substrate and the LDH in the substrate (point analysis) in the cross-sectional image were analyzed with an energy dispersive X-Ray spectrometer (EDS) (NORAN System SIX available from Thermo Fisher Scientific) at an accelerating voltage of 15 kV. As a result, C, Mg, and Al, which are LDH constituent elements, were detected in the LDH contained in the functional layer, in other words, both the LDH membrane on the face of the substrate and the LDH in the substrate. Mg and Al are constituent elements of the hydroxide base layer whereas C corresponds to $CO_3^{2-}$ anions contained in an intermediate layer of the LDH.

Evaluation 4: Test for Evaluating Denseness

Figure 12A:
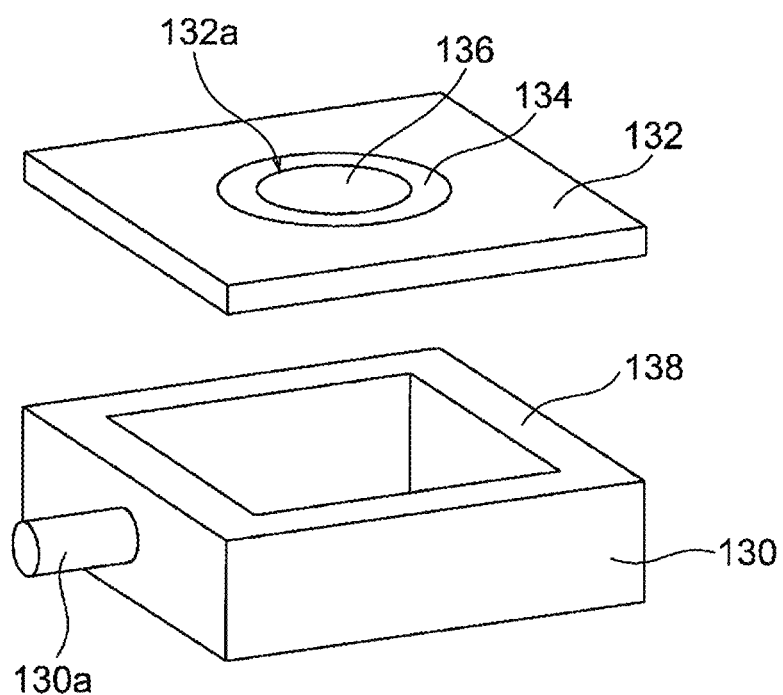
FIG. 12A is an exploded perspective view of an airtight measuring container used in a test for evaluating denseness in Example 3.
Figure 12B:
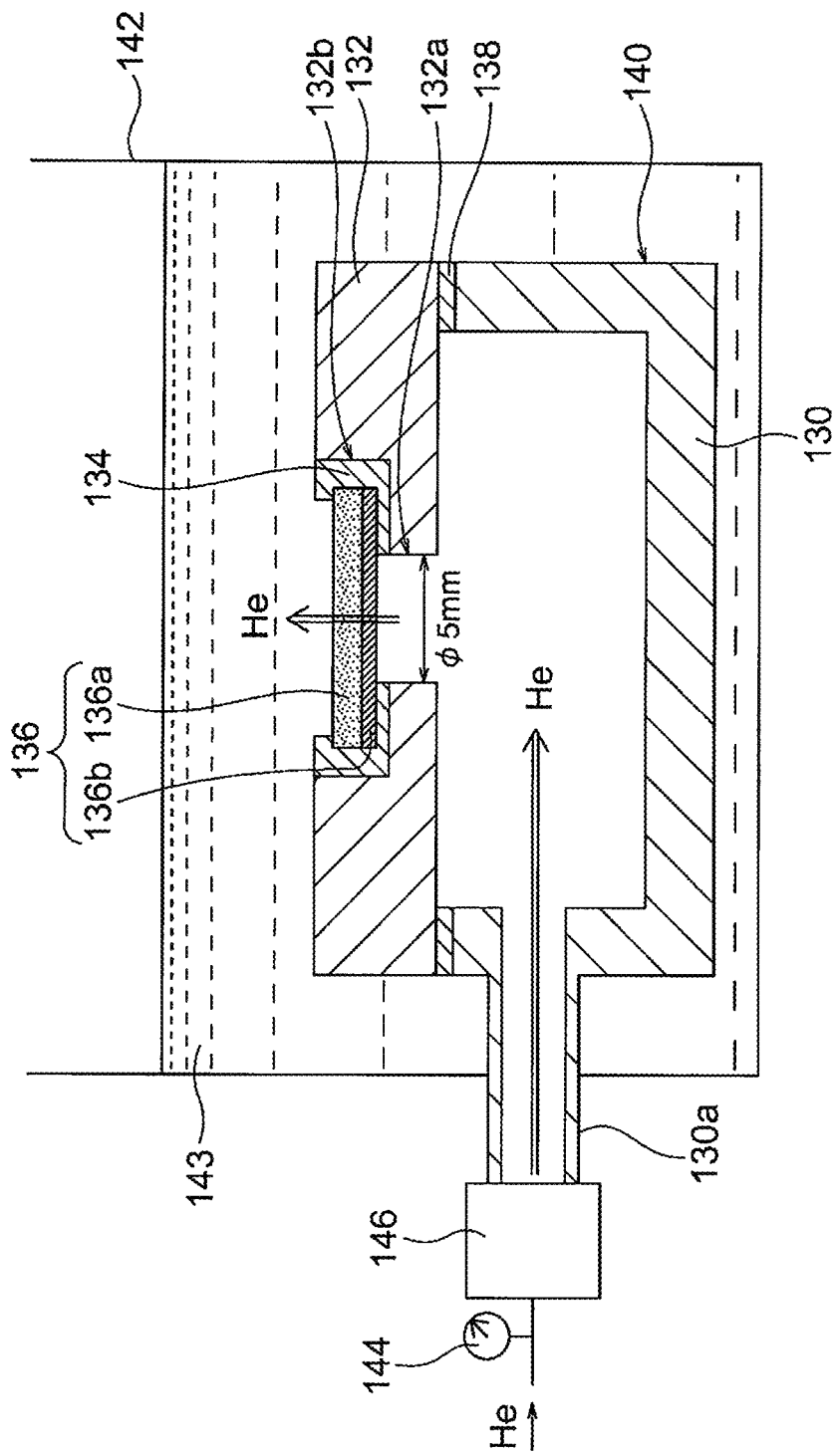
FIG. 12B is a schematic cross-sectional view of a measuring system used in the test for evaluating the denseness in Example 3.

In order to confirm that the functional layer has high denseness enough to exhibit gas impermeability, the test for evaluating denseness was performed. As illustrated in FIGS. 12A and 12B, an acryl container 130 and an alumina jig 132 with a size and shape that function as a lid for the acryl container 130 were provided. The acryl container 130 had a gas supply port 130a feeding a gas into the container 130. The alumina jig 132 had an opening 132a with a diameter of 5 mm. A recess 132b for holding a sample was disposed along the outer circumference of the opening 132a. An epoxy adhesive 134 was applied to the recess 132b of the alumina jig 132. A functional layer 136b of a composite material sample 136 was laid on the recess 132b and liquid-tightly bonded to the alumina jig 132. The alumina jig 132 joined to the composite material sample 136 was air-tightly and liquid-tightly bonded to the top of the acryl container 130 with a silicone adhesive 138 to completely seal the open top of the acryl container 130. An airtight container 140 for measurement was thereby prepared. The airtight container 140 was placed into a tank 142. The gas supply port 130a to the acryl container 130 was connected to a pressure gauge 144 and a flowmeter 146 to permit feeding of a helium gas into the acryl container 130. The tank 142 was filled with water 143 such that the airtight container 140 was completely under the water. At this time, the air tightness and liquid tightness in the airtight container 140 was sufficiently maintained. The functional layer 136b of the composite material sample 136 was exposed to the internal space of the airtight container 140 whereas a porous substrate 136a of the composite material sample 136 was in contact with the water in the tank 142. In this state, a helium gas was introduced into the airtight container 140 through the gas supply port 130a to the acryl container 130. The pressure gauge 144 and the flowmeter 146 were controlled such that the differential pressure between the inside and the outside of the functional layer 136b was 0.5 atm, in other words, such that the pressure applied to one face of the functional layer 136b exposed to the helium gas was 0.5 atm higher than the water pressure applied to the other side). Bubbling of helium gas from the composite material sample 136 in the water was checked. If no bubbling of the helium gas was observed, the functional layer 136b was determined to have sufficiently high denseness to exhibit gas imperme-ability. As a result, the functional layer and the composite material proved to have high denseness to exhibit gas impermeability.

Evaluation 5: Determination of He Permeability

Figure 13A:
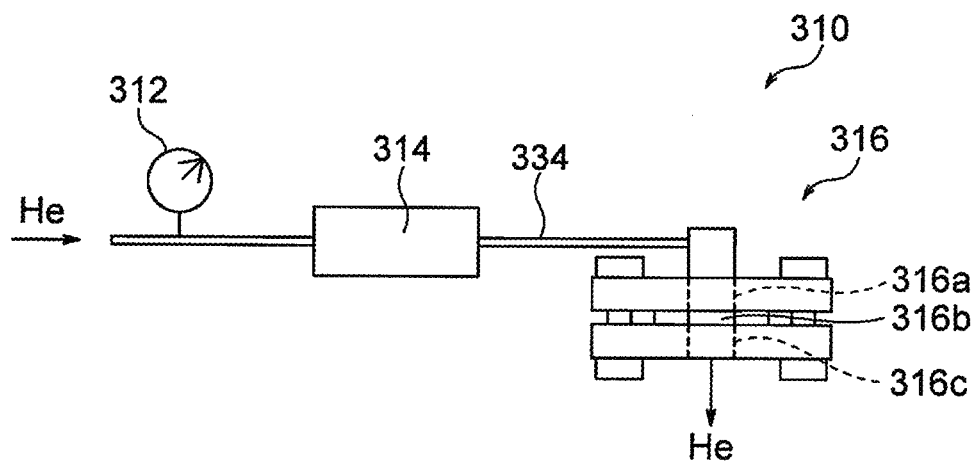
FIG. 13A is a conceptual diagram of an exemplary He permeability measuring system used in Example 3.
Figure 13B:
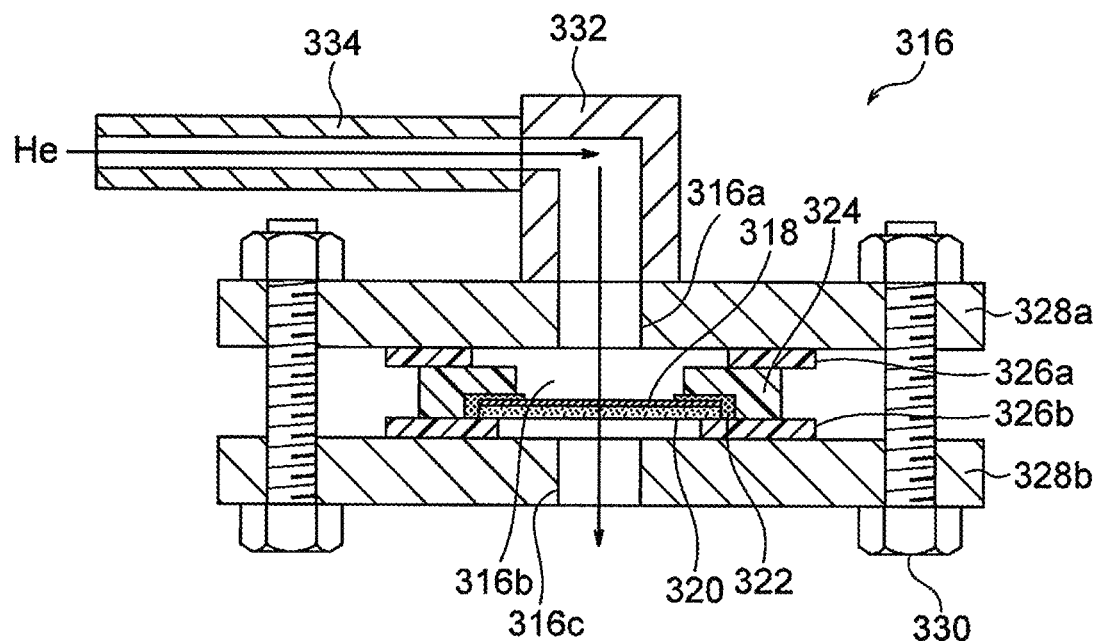
FIG. 13B is a schematic cross-sectional view of a sample holder and its peripheral components used in the measuring system in FIG. 13A.

The He permeability of the functional layer was determined for evaluation of the densities of these samples as follows. A He permeameter system 310 was provided as illustrated in FIGS. 13A and 13B. In the He permeameter system 310, He gas was fed from a He gas cylinder to a sample holder 316 through a pressure gauge 312 and a flowmeter 314 (digital flowmeter) and then fed to one face of a functional layer 318 held by the sample holder 316, so that the He gas permeated the functional layer 318 and exited through the other surface.

The sample holder 316 including a gas inlet 316a, a hermetic space 316b, and a gas outlet 316c was assembled as follows. The functional layer 318 was attached to a jig 324 (composed of ABS resin) having a central opening with an adhesive 322 applied to the periphery of the functional layer 318. Sealing members (butyl rubber packings) 326a and 326b were respectively disposed on the upper and lower surfaces of the jig 324, and support members having openings (flanges) 328a and 328b composed of PTFE were respectively disposed on the sealing members 326a and 326b. Thus, the hermetic space 316b was defined by the functional layer 318, the jig 324, the sealing member 326a, and the support member 328a. The functional layer 318 was provided in the form of a composite material, i.e., the functional layer 318 was disposed on the porous substrate 320 so as to face the gas inlet 316a. The support members 328a and 328b were fixed to each other with fasteners (screws) 330 so as to prevent the leakage of He gas through sites other than the gas outlet 316c. A gas feeding tube 334 was connected to the gas inlet 316a of the sample holder 316 with a joint 332.

Subsequently, He gas was fed to the He permeameter system 310 through the gas feeding tube 334 so that the He gas permeated the functional layer 318 held in the sample holder 316. The pressure and flow rate of the gas fed were monitored with the pressure gauge 312 and the flowmeter 314. The He permeability was calculated after the permeation of the He gas for 1 to 30 minutes. The He permeability was calculated by the expression F/(P×S) where F represents the amount of the He gas permeated per unit time ($cm^3$/min), P represents a differential pressure (atm) applied to the functional layer during permeation of the He gas, and S represents the membrane area ($cm^2$) through which the He gas permeates. The amount F of the He gas permeated ($cm^3$/min) was read directly from the flowmeter 314. The differential pressure P was a gauge pressure read from the pressure gauge 312. The He gas was fed so as to achieve a differential pressure P of 0.05 to 0.90 atm.

The resulting He permeability of the functional layer and the composite material were each 0.0 cm/min·atm.

What is claimed is:

1. An electrode-separator assembly for a nickel-zinc battery, comprising:
    a positive-electrode plate containing nickel hydroxide and/or nickel oxyhydroxide;
    a negative-electrode plate containing zinc and/or zinc oxide;
    a layered double hydroxide (LDH) separator for separation of the positive-electrode plate from the negative-electrode plate, the LDH separator being capable of conducting hydroxide ions therethrough; and
    a resin frame having an opening, the LDH separator and the positive-electrode plate being at least one of fitted in and joined directly to the opening, wherein
    the positive-electrode plate has a narrower face than the negative-electrode plate such that the negative-electrode plate has a clearance area that does not overlap with the positive-electrode plate over a predetermined width from the outer peripheral edge of the negative-electrode plate,
    the peripheral end faces of the LDH separator and a segment of the LDH separator are covered with the resin frame, the segment being adjacent to the positive-electrode plate and corresponding to the clearance area,
    the peripheral end faces of the positive-electrode plate adjacent to the LDH separator are at least partially covered with the resin frame, and
    the resin frame extends along the thickness of the negative-electrode plate so as to cover the peripheral end faces of the negative-electrode plate.

2. The electrode-separator assembly according to claim 1, wherein the clearance area has a width ranging from 1 to 10 mm.

3. The electrode-separator assembly according to claim 1, wherein the positive-electrode plate comprises a positive-electrode collector having a positive-electrode collector tab extending from one side of the outer periphery of the positive-electrode plate, and the negative-electrode plate comprises a negative-electrode collector having a negative-electrode collector tab extending from one side of the outer periphery of the negative-electrode plate.

4. The electrode-separator assembly according to claim 3, wherein the positive-electrode collector tab and the negative-electrode collector tab extend in opposite directions.

5. The electrode-separator assembly according to claim 1, wherein the peripheral end faces of the negative-electrode plate are sealed with sealing members and/or an adhesive.

6. The electrode-separator assembly according to claim 1, wherein the LDH separator is gas-impermeable and/or water-impermeable.

7. The electrode-separator assembly according to claim 1, wherein the LDH separator is a composite with a porous substrate.

8. The electrode-separator assembly according to claim 7, wherein the LDH separator has a LDH membrane composed of an aggregate of multiple platy LDH particles, and the platy LDH particles are oriented vertical or oblique to the face of the porous substrate.

9. The electrode-separator assembly according to claim 1, wherein the positive-electrode plate and/or the negative-electrode plate are wrapped with a non-woven fabric, the non-woven fabric being impregnated or impregnatable with an electrolyte containing an aqueous alkali metal hydroxide solution.

10. A nickel-zinc battery comprising:
a resin container;
the electrode-separator assembly according to claim 1, the assembly being accommodated in the resin container; and
an electrolyte containing an aqueous alkali metal hydroxide solution.

11. A nickel-zinc battery pack comprising:
a resin container;
a plurality of the electrode-separator assemblies according to claim 1 disposed in parallel and accommodated in the resin container without being separated from each other by partition walls; and
an electrolyte containing an aqueous alkali metal hydroxide solution.

12. The nickel-zinc battery pack according to claim 11, wherein
the positive-electrode plates comprise respective positive-electrode collectors having respective positive-electrode collector tabs extending from one side of the outer periphery of the positive-electrode plates, and the negative-electrode plates comprise respective negative-electrode collectors having respective negative-electrode collector tabs extending from one side of the outer periphery of the negative-electrode plates, the positive-electrode collector tabs and the negative-electrode collector tabs extending in opposite directions, and
the positive-electrode collector tabs are connected to a positive-electrode collector terminal, and the negative-electrode collector tabs are connected to a negative-electrode collector terminal, the positive-electrode collector terminal and the negative-electrode collector terminal being disposed at opposite sides of the resin container.

* * * * *